June 13, 1950 — C. B. FULTON — 2,511,254
VEHICLE SPRING
Filed Nov. 2, 1945
Fig.1.
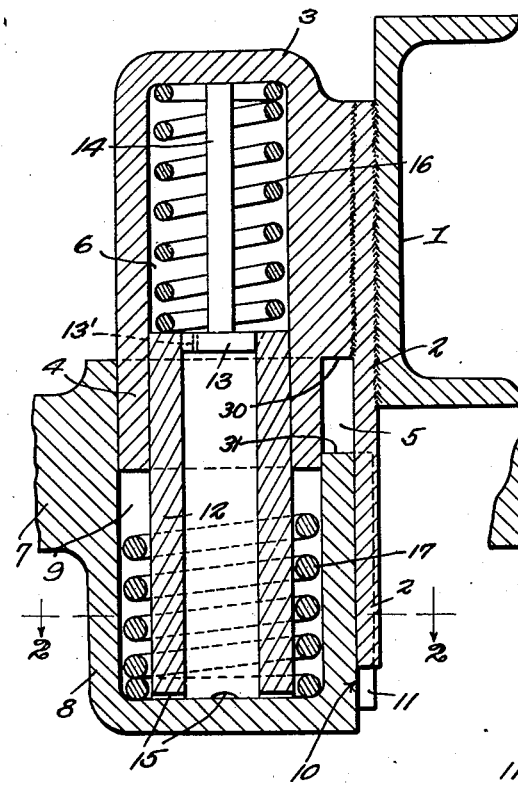
Fig.3.
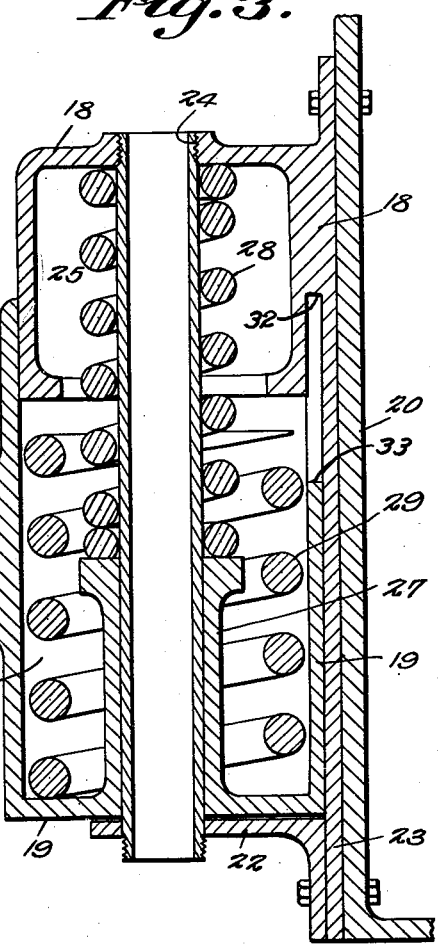
Fig.2.
C. B. Fulton
INVENTOR.
BY Abner & Co.
ATTORNEYS.

Patented June 13, 1950

2,511,254

UNITED STATES PATENT OFFICE 2,511,254

VEHICLE SPRING

Carroll B. Fulton, San Antonio, Tex.

Application November 2, 1945, Serial No. 626,301

7 Claims. (Cl. 267—60)

This invention relates to vehicle springs designed primarily for use in vehicles designed for carrying varying loads, such as automobiles, trucks, trailers, railroad cars, etc.

It is a fact well known that if springs are provided to absorb road shocks for empty or lightly loaded vehicles, the same springs will become completely and rigidly closed when subjected to a heavy load. Likewise, if a heavy spring is provided for use with heavy loads, said spring will not have sufficient resiliency to absorb the shocks when the vehicle is lightly loaded.

It is an object of the present invention to provide a resilient load supporting unit utilizing a new and novel arrangement of compression springs which will operate to absorb not only normal shocks occurring when the vehicle is empty or lightly loaded, but will also absorb the shocks of a heavily loaded vehicle.

It is a further object to provide a resilient supporting unit having springs the resiliency of which are compounded and computed in such a manner that at no time will any spring become completely closed because of a shock to which it is subjected.

A still further object is to provide a supporting unit of this type having a plurality of springs one of which will serve to absorb normal shocks but, when the vehicle is heavily loaded and the shocks are more severe, the springs will cooperate to absorb these heavier shocks and thus prevent any one of the springs from completely closing.

A still further object is to provide a spring supporting or suspension unit, the relatively movable parts of which are so guided as to prevent excessive frictional contact between said members, as when the brakes of said vehicle are applied or the vehicle is under acceleration or when said vehicle is rounding curves or travelling on inclined surfaces.

Another object is to provide a resilient suspension unit which is compact in structure, will provide a spring action suitable for the heaviest loads and also remain unaffected by excessive pressures between the relatively movable members caused by momentum and/or inertia as well as dead load weight.

A still further objective is to provide a spring supporting or suspension unit which functions independently from any additional or other suspension units provided on the vehicle, the function of the independent suspension being analogous to the conventional individual springing system used on the front wheels of common vehicles.

With the foregoing and other objects in view which will appear as the description proceeds, the invention consists of certain novel details of construction and combinations of parts hereinafter more fully described and pointed out in the claims; it being understood that changes may be made in the construction and arrangement of parts without departing from the spirit of the invention as claimed.

In the accompanying drawing, the preferred form of the invention has been shown.

In said drawing:

Figure 1 is a central vertical section through a suspension unit constructed in accordance with the present invention.

Figure 2 is a section through a portion thereof taken substantially on the line 2—2, Figure 1.

Figure 3 is a view similar to Figure 1 showing a slightly modified form.

Referring to the figures by characters of reference, 1 designates a portion of the chassis or frame of a vehicle to which is fixedly secured, by welding or otherwise, a depending guide plate 2 to the upper portion of which is welded or otherwise fixedly joined the upper housing member 3 of the unit.

The lower end portion of this member is cylindrical and has been indicated at 4. This cylindrical lower end is spaced from the guide plate 2, as at 5, and a cylindrical chamber 6 is extended upwardly into the member 1 from the lower end thereof, this chamber being closed at its upper end as shown. The chamber is concentric with the lower end 4 of the member 3.

A portion of an axle has been illustrated at 7 and is extended radially from the lower member 8 of the unit. This member has a cylindrical chamber 9 extending downwardly thereinto from its upper end and so proportioned that the lower end portion 4 of the upper member can fit snugly therein although free to slide relative thereto. One of the outer walls of the chamber 9 is flat, for snug sliding contact with the guide plate 2, this wall 10 being provided with side shoulders 11 which lap the corresponding sides of the plate 2. Thus the lower member 8 constitutes a slide which engages the guide plate 2, the plate constituting a slideway therefor, and said plate cooperates with this slide to resist any relative movement of the parts which otherwise might occur as when the brakes of said vehicle are applied, or the vehicle is under acceleration, or when said vehicle is rounding curves, or traveling on inclined surfaces.

Extending upwardly from the bottom of the chamber 9 is a concentric cylinder 12 which projects a substantial distance into the chamber 6 and is proportioned to receive a shock absorbing piston 13. This piston is joined to the lower end of a rod 14 extending from the closed upper end of the chamber 6 and held fixed relative thereto. Bypass openings 15 extend through the wall of cylinder 12 close to the bottom of the chamber 9 and constitute means for permitting free circulation of oil between chamber 9 and the interior of cylinder 12.

A vent 13' is provided in piston 13 to allow the oil, which is compressed in chamber 9 and cylinder 12, simultaneously, to escape into chamber 6.

An upper coiled spring 16 is located in the chamber 6 and bears constantly at its ends against the upper end of the chamber 6 and the upper end of the cylinder 12 respectively. This spring is designed to carry an unloaded vehicle body or a very light load. Another coiled spring which is much stronger than the spring 16, is positioned in the chamber 9 and extends around the lower portion of cylinder 12. The spring 17 is seated on the bottom of chamber 9 and its upper end is normally spaced from the lower end of the cylinder 4. It will be noted, also, that the distance between the wall 10 of the lower member 8 and the upper end of the space 5 is greater than the distance between the spring 17 and the lower end of cylinder 4.

Obviously, under normal conditions where a vehicle body is lightly loaded or has no load at all, the weight will be transferred through the spring 16 to cylinder 12 and lower member 8 and all light shocks will be absorbed by this spring. This movement of the upper member relative to the lower member is permitted in view of the fact that there is a clearance at 5 between the members. When the vehicle is heavily loaded, however, and the spring 16 cannot carry the load by itself, the resistance of said spring is gradually overcome until the lower end of the upper member, which is the cylindrical portion 4, comes into contact with the stronger spring 17. This latter spring will then be placed under compression and will act in cooperation with the spring 16 to absorb all shocks resulting from heavier loads.

It is to be understood that the action of the springs in absorbing shocks is at all times supplemented by the piston 13 working within the shock absorbing cylinder 12.

Where extremely heavy loads are to be carried, the structure of the suspension unit can be modified to insure vertical rigidity of the suspension unit while rounding curves or travelling along inclined surfaces. This modified structure has been illustrated in Figure 3. It includes interfitting relatively slidable upper and lower members 18 and 19, the upper member being fixedly joined to the frame 20 of the vehicle while the lower member 19 has the axle 21 extended therefrom. In this modified structure a bracket 22 is fixedly secured to the guide plate 23 and, in turn, is connected to the top of the upper member 18 by a guide stem 24 which can be tubular as shown. This stem is concentric with the chambers 25 and 26 in the upper and lower members and is surrounded and slidably engaged by an elongated guide sleeve 27 extending upwardly from the bottom of the chamber 26. Thus, the stem 24 constitutes a rigid slideway that is analogous in function to the plate 2 of the first form, this slideway engaging the lower member and preventing any movement thereof out of coaxial alignment with the upper member. The guide sleeve or cylinder 27 serves to support the upper spring 28 which is engaged by the upper end wall of chamber 25 while the lower or heavier spring 29 bears at its lower end upon the bottom of chamber 26 and extends around guide cylinder 27 and thence upwardly around the lower portion of the spring 28. It terminates, however, where it is normally spaced from the lower end of the upper member 18. In this structure, greater loads can be carried and shocks will at all times be properly absorbed. Moreover, greater vertical rigidity of the suspension unit is insured because of the use of longer cooperating slidably engaging portions.

As seen from Fig. 1, the upper member 3 has a shoulder 30 which will abut against shoulder 31 of the lower member 8 on telescoping of the members due to suddenly occurring heavy road shocks or the like. The normal distance between these shoulders, as seen from Fig. 1, is less than the total spaces occurring between and at the ends of the convolutions of the respective springs 16, 17. Accordingly, the upper and lower members will abut or engage each other before the convolutions of either spring can come completely closed. The form of Fig. 3 is provided with a similar arrangement, wherein the upper member has a shoulder 32 and the lower member has a shoulder 33 adapted to engage each other under similar circumstances. It will be understood that in either case, the resiliency of the springs is such, when both springs are brought into action, as to withstand heavy load or shock conditions without closing of the convolutions. However, sometimes a heavily loaded vehicle moving at high speed strikes a sharp, high obstruction, and it is to prevent the closing of the springs under circumstances such as this, that I provide the abutting shoulder construction illustrated and described.

What is claimed is:

1. The combination with the axle and frame of a vehicle structure, of a compound suspension unit interposed therebetween and including upper and lower relatively movable interfitting members fixedly joined to the frame and axle respectively, a slideway, rigid with the frame, slidably engaged by the lower member, a guide within the lower member, a spring interposed between said guide and the upper member, and a supplemental spring in the lower member and extending around the guide, said lower spring being normally spaced from the upper member and positioned to receive thrust therefrom following a predetermined compression of the first named spring, said members being proportioned for abutting engagement after predetermined relative movement toward each other and before closing of the convolutions of either spring.

2. The combination with the frame and axle of a vehicle structure, of interfitting slidably connected upper and lower members fixedly joined to the frame and axle respectively, an upstanding guide in the lower member, a shock absorbing spring interposed between said guide and the upper member, said spring being proportioned to absorb light shocks due to relative movement of the axle and frame, a slideway fixedly connected to the frame and slidably engaged by the lower member, a heavier spring seated in and bearing downwardly against the lower member, said heavier spring being normally spaced from the upper member and positioned for contact by the upper member to absorb shocks resulting from relative movement of the axle and frame under heavy loads, and means adapted to stop relative movement of the members toward each other before closing of the convolutions of either spring.

3. The combination with the relatively movable axle and frame of a vehicle structure, of spring suspension means interposed therebetween and including upper and lower interfitting slidably connected members fixedly joined to the frame and axle respectively, a separate slideway for the lower member carried by, and immovable relative to, the frame, a coiled spring within the lower member and supported in the path of but normally out of contact with the upper member, and a lighter coiled spring within the upper member and exerting a constant thrust against the lower member for absorbing shocks resulting from relative movement of the frame and axle under normal loads, said members being proportioned for abutting engagement after predetermined relative movement toward each other, and before closing of the convolutions of either spring.

4. The combination with the relatively movable frame and axle of a vehicle structure, of a spring suspension interposed therebetween and including upper and lower interfitting relatively slidable members fixedly joined to the frame and axle respectively, means rigidly carried by the frame proportioned for slidable interfitting engagement with the lower member at a point spaced from the upper member, a cylindrical guide in the lower member, a spring extending therearound and supported by the lower member, said spring being normally spaced from but in the path of the upper member, and a lighter spring interposed between the guide cylinder and the upper member and maintained constantly under compression by the weight of the frame and its load, said members being proportioned to abut against each other after predetermined relative movement toward each other and after engagement of the first-named spring by the upper member, said members being adapted so to engage each other before closing of the convolutions of either spring.

5. The combination with the frame and axle of a vehicle structure, of a spring suspension unit interposed therebetween and including upper and lower relatively movable interfitting members fixedly joined to the frame and axle respectively, cooperating means on the frame and members for guiding said members during their relative movement, a guide within and upstanding from the bottom of the lower member, a coiled compression spring in the lower member and extending around the guide, said compression spring being positioned in the path of but normally out of contact with the upper member, and a lighter compression spring interposed between the guide and the upper portion of the upper member and maintained under constant compression by the weight of the frame, said lower spring being positioned to be compressed by the upper member when the upper spring is subjected to a predetermined degree of compression.

6. The combination with the relatively movable frame and axle of a vehicle structure, of a spring suspension unit interposed therebetween and enclosing upper and lower interfitting slidably engaging members fixedly joined to the frame and axle respectively, a cylindrical guide in the lower member and fixed thereto, a piston movable with the upper member and within the guide, a coiled compression spring in the lower member and around the guide, said spring being in the path of but normally spaced from the upper member, and a lighter coiled spring interposed between the guide and the upper portion of the upper member, said lighter spring being maintained under constant compression by the weight of the frame, said lower spring being positioned for compression by the upper member when the lighter or upper spring is subjected to more than a predetermined compression.

7. The combination with the frame and axle of a vehicle structure, of a spring suspension interposed therebetween and including upper and lower interfitting relatively slidable members fixedly joined to the frame and axle respectively, interfitting means on the members and frame for guiding the members during their relative sliding movement, a guide within the lower member, a bracket fixed to the frame, a guiding element connecting said bracket to the upper member and extending through the guide in the lower member for sliding engagement thereby, a coiled compression spring extending around the guide and within the lower member, said compression spring being in the path of but normally spaced from the upper member, and a lighter compression spring bearing at one end on the guide in the lower member and at its other end against the upper portion of the upper member, said lighter spring being maintained constantly under compression by the weight of the frame.

CARROLL B. FULTON.

REFERENCES CITED

The following references are of record in the file of this patent:

UNITED STATES PATENTS

| Number | Name | Date |
| --- | --- | --- |
| 212,688 | Hansell | Feb. 25, 1879 |
| 1,549,367 | Lancia | Aug. 11, 1925 |
| 1,614,721 | Erne | Jan. 18, 1927 |
| 1,628,749 | Samuels | May 17, 1927 |
| 2,069,791 | Wallace | Feb. 9, 1937 |

FOREIGN PATENTS

| Number | Country | Date |
| --- | --- | --- |
| 328,974 | France | May 16, 1903 |
| 383,481 | France | Jan. 9, 1908 |
| 26,267 | France | May 8, 1923 |
| 102,651 | Switzerland | Dec. 17, 1923 |